United States Patent [19]
Kornhauser

[11] Patent Number: 5,597,179
[45] Date of Patent: Jan. 28, 1997

[54] AIRBAG INFLATION DEVICES AND METHODS

[76] Inventor: Murray Kornhauser, 620 Argyle Rd., Wynnewood, Pa. 19096

[21] Appl. No.: 200,392

[22] Filed: Feb. 23, 1994

[51] Int. Cl.⁶ .................................................. B60R 21/32
[52] U.S. Cl. ........................ 280/735; 280/736; 280/728.1
[58] Field of Search ............................... 280/728.1, 738, 280/741, 737, 736, 735, 734; 102/530, 531; 222/3

[56] References Cited

U.S. PATENT DOCUMENTS

| | | | |
|---|---|---|---|
| 3,788,669 | 1/1974 | Usui et al. | 280/737 |
| 3,882,213 | 6/1975 | Goetz | 280/738 |
| 4,095,624 | 6/1978 | Davis | 222/3 X |
| 5,098,123 | 3/1992 | Jones | 280/741 |
| 5,146,104 | 9/1992 | Schumacher et al. | 280/735 X |
| 5,301,979 | 4/1994 | Allard | 280/737 |
| 5,337,674 | 8/1994 | Harris et al. | 280/741 X |
| 5,415,845 | 5/1995 | Brede et al. | 280/741 X |

Primary Examiner—Christopher P. Ellis
Attorney, Agent, or Firm—Duane, Morris & Heckscher

[57] ABSTRACT

Methods and apparatus for inflating airbags in vehicles. Systems for inflating airbags comprise electrical storage devices interfaced with switching devices that switch the electrical energy into an actuating subsystem to inflate the airbags. The actuating systems can be coils, which are interfaced with plates that open the airbag. The airbags are inflated with ambient or above ambient pressures. Airbag inflation systems described herein eliminate the need to use external gases which are potentially harmful to inflate the airbags. Furthermore, the use of air from the automobile's passenger compartment eliminates overpressure problems which may exist as a result of multiple airbags being inflated at one time.

22 Claims, 6 Drawing Sheets

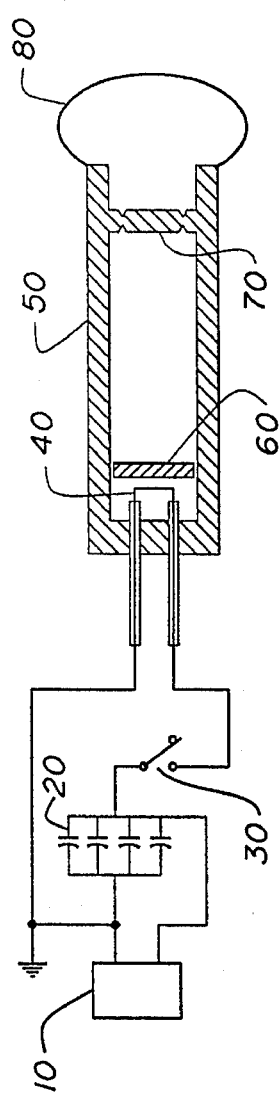
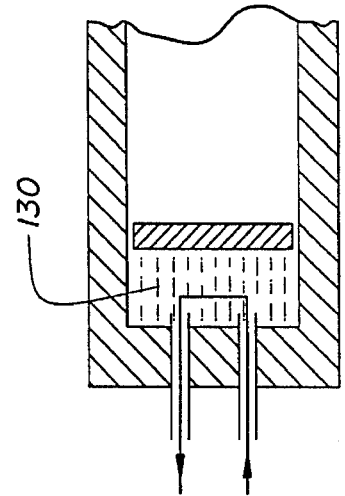
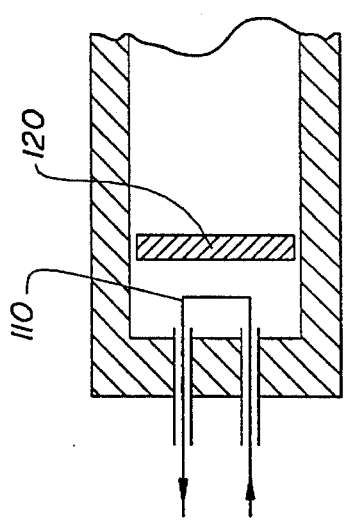
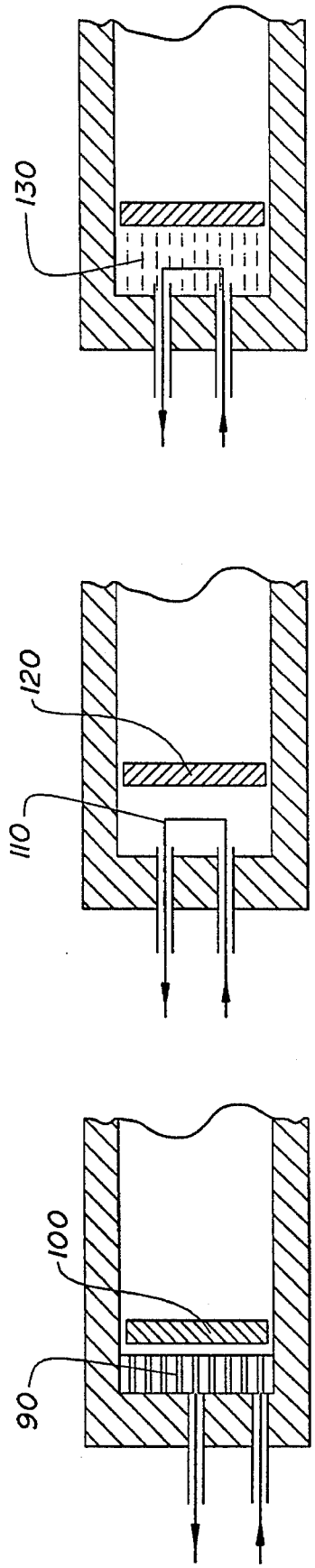

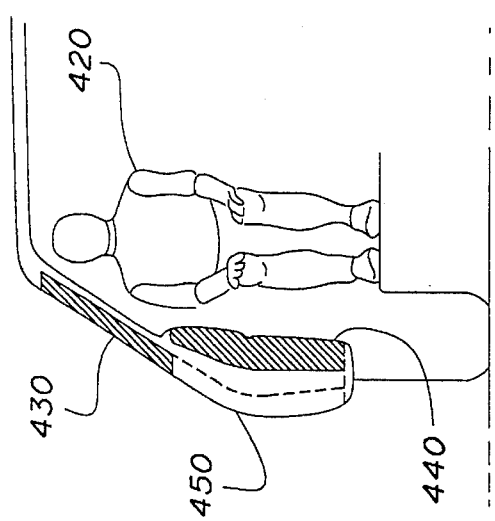
FIG. 5B
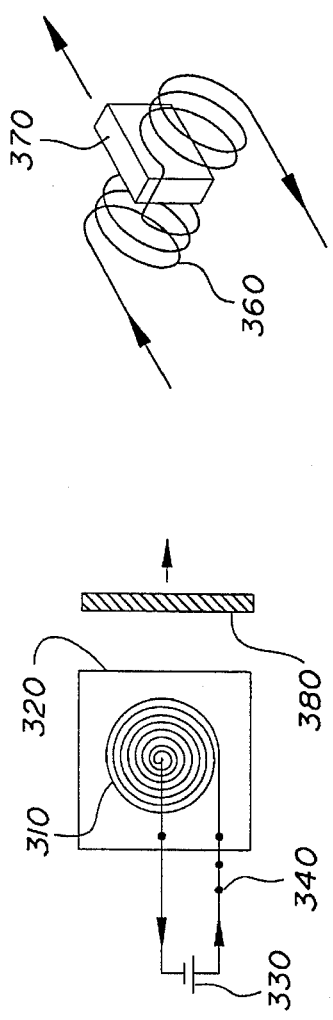
FIG. 5A
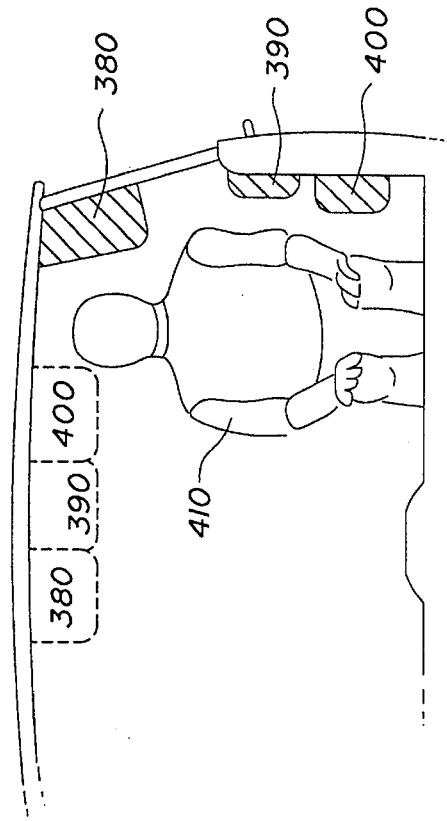
FIG. 6
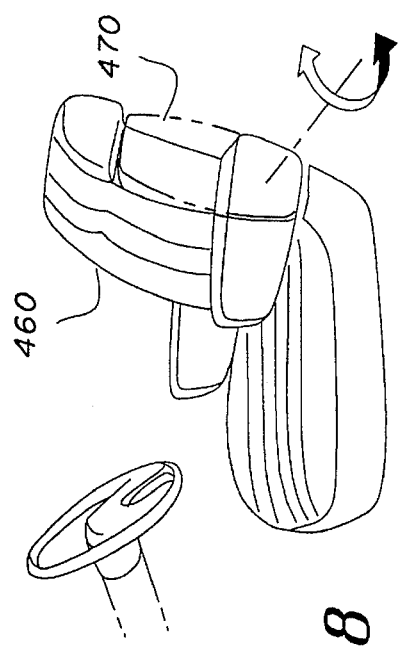
FIG. 7
FIG. 8

AIRBAG INFLATION DEVICES AND METHODS

FIELD OF THE INVENTION

This invention relates to airbags in vehicles. More specifically, this invention relates to systems for inflating airbags in vehicles.

BACKGROUND OF THE INVENTION

Airbags for automotive vehicles have been mandated by the National Highway Transportation Safety Administration (NHTSA) for many years since they protect passengers in vehicles during the impact phase of an accident. Typically, prior airbag systems comprise an airbag interfaced to a source of airbag propellant which inflates the airbag when a sensor in the system senses a vehicle impact above a certain velocity. The propellant, such as sodium azide, is usually in solid form in a canister. The sodium azide canisters are triggered by a pyrotechnic-type device which ignites the propellant. The burning propellant generates a high pressure gas which is used to inflate the airbag.

Although propellants and compressed gases are the common sources of energy for inflating automobile airbags and other airbag systems, they are potentially hazardous. Not only can they be dangerous in cases of accidental fire, but they may prove to be attractive nuisances when juvenile delinquents learn how to use the energetic materials and components to construct weapons.

Another difficulty that arises with the use of propellants and compressed gases to inflate airbags is the effect of overpressure built up in the confined volume of air in the passenger compartment of the vehicle when the airbag inflates. When the bags are inflated with the external compressed gases they displace some of the compartment's air, thereby compressing the air outside the bags. In automobiles, the overpressure becomes dangerous if more than two bags are inflated simultaneously. Overpressure buildup may rupture the eardrums of passengers in the vehicle and cause other injuries. Thus, more extensive application of airbags for rear seats and side panel protection of passengers is not possible in conventional systems using external gases to inflate the airbags.

Inflatable airbags have the advantage of compact stowage before they are called upon to provide protection, and can be deflated rapidly in order to limit the time that they interfere with the driver's vision. Pre-formed cushion materials, such as foam padding, which also protect passengers, have the advantage that their cushioning properties can be tailored to maximize their practical potential in each application. However, they are commonly employed as fixed panels or bolsters or barriers. It would be desirable to combine the advantages of airbags with the advantages of rapidly deployed pre-formed cushions to accomplish complete protection of individuals in vehicles during accidents. Such results have not heretofore been achieved in the art.

SUMMARY OF THE INVENTION

The above-referenced needs are met and problems solved by systems for inflating airbags in vehicles provided in accordance with the present invention. In preferred embodiments, the systems comprise first means for storing electrical energy, second means interfaced with the first means for switching the electrical energy so that the electrical energy can actuate inflation of the airbag, and actuation means interfaced with the second means for receiving the electrical energy to inflate the airbag.

More preferably, the first means is a battery and, more preferably, a capacitor or bank of capacitors. Additionally, the second means for switching is preferably a silicon controlled rectifier, and the actuation means is a coil.

Still more preferably, the system comprises inflation means interfaced with the coil and the airbag for converting the electrical energy to mechanical energy to open the airbag. In a preferred embodiment, the inflation means is a plate. In still further preferred embodiments, means interfaced with an airbag for causing air in the vehicle to inflate the airbag as the plate opens the airbag is provided. The means for causing air in the vehicle to inflate the airbag is most preferably an orifice. Since the air from the airbag is preferably drawn from the passenger compartment, the net effect of inflating the airbag on overpressure in the compartment is substantially zero. Additionally, sensor means are interfaced to the second means for sensing a collision and sending a signal to the second means to charge the actuation means.

Methods of inflating an airbag which protects passengers in an automobile passenger compartment during a collision are also provided in accordance with the present invention. The present invention will be best understood by those with skill in the art by reading the following detailed description of preferred embodiments in conjunction with the drawings which are first described briefly below.

BRIEF DESCRIPTION OF THE DRAWINGS

FIG. 1 is a schematic diagram of a system for inflating an airbag.

FIGS. 2A–2C are schematic representations of driver subsystems for compressing air to inflate an airbag.

FIGS. 5A and 5B are alternative embodiments of coils which are used to induce eddy currents to drive plates so that airbags can be inflated.

FIGS. 6, 7 and 8 are schematic representations of pre-formed cushion systems which can be used to protect passengers and which may be deployed using electromagnetic energy.

DETAILED DESCRIPTION OF PREFERRED EMBODIMENTS

Figure 3:
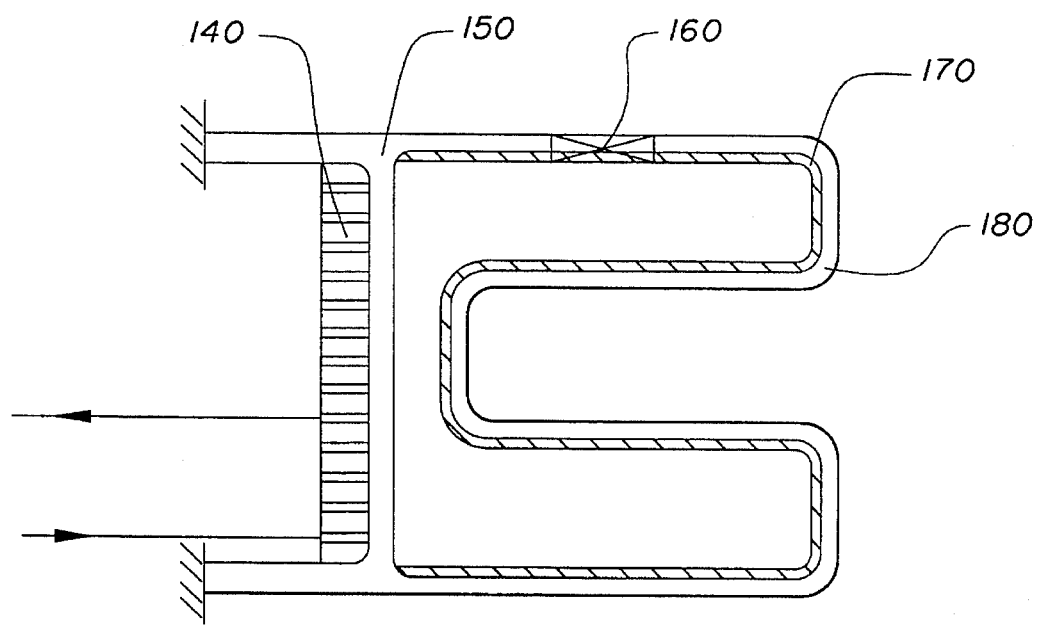
FIG. 3 is a schematic representation of yet another embodiment of a driver subsystem which inflates an airbag that has been first folded.

Referring now to the drawings wherein like reference numerals refer to like elements, the components of an electrical automobile airbag inflation system are shown in FIG. 1. The automobile's electrical system 10, comprising in part the automobile battery, maintains electrical charge on a capacitor bank 20, in readiness for the emergency situation that leads to switch 30 being closed. When switch 30 is closed in response to a signal from a crash sensor 25 located on the vehicle, the electrical charge is dumped into driver subsystem 40 of air cylinder 50. As used herein, the term "driver subsystem" is any device which causes a mechanical means to be actuated to compress air. The driver subsystem, to be described further, propels piston 60 suddenly and at high speed, compressing the air which was initially contained between the piston and a release valve 70. When the air pressure reaches a high, pre-determined value, release valve 70 opens and air drawn from the automobile or other type of vehicle rushes into airbag 80, thereby inflating the airbag.

After the electrical energy enters the driver subsystem, there are several means of converting the electrical energy to the kinetic energy of the piston. One method is electromagnetic as shown in FIG. 2A wherein the driver subsystem is a coil. When the actuating switch 30 is closed, an electrical current is delivered to electromagnetic coil 90. In a preferred embodiment, the switch 30 may be a silicon controlled rectifier or a simple low electrical resistance mechanical switch. The coil generates an electromagnetic field that induces eddy currents in piston 100, and the eddy currents produce a field that opposes the coil's field. The opposing fields provide repelling forces between the coil and the piston, and these forces accelerate the piston away from the coil, thus transferring energy to the piston in the form of kinetic energy. In turn, the piston's kinetic energy is converted to the potential energy of the air as the air's volume decreases and its pressure increases.

An alternate means of converting the electrical energy is to dump the electrical energy suddenly into a metallic circuit element so that the metallic element explodes, generating a high pressure plasma, as shown in FIG. 2B. The plasma consists of vaporized and molten metallic particles that expand at high velocity. Since exploding element 110 is located adjacent to piston 120, the plasma acts as rocket propellant, accelerating the piston to high velocity and high kinetic energy.

A third means of developing pressure on the piston is to fill the cavity behind the piston with a fluid 130, and to locate the exploding circuit element inside the fluid-filled cavity, as shown in FIG. 2C. This approach has been used in electrohydraulic metal forming systems, where a metal blank is used in place of the piston and the blank is hurled against a die at high speed. Pressures as high as 35,000 psi have been measured at a distance of one inch from an exploding wire into which 18 kilojoules of electrical energy has been dumped. Such pressures are more than adequate for accelerating the piston for purposes of compressing the air in the driver subsystem.

If the volume of the driver cylinder is considered to be excessively large, an alternate approach is to employ a reciprocating piston. The cylinder volume will then be reduced, depending on the number of reciprocating cycles employed to inflate the airbag.

The valve that releases the compressed air to enable it to flow into the airbag may consist of a disk that ruptures at a predetermined pressure, or any other valve that operates quickly enough to inflate the airbag. In some applications, the valve may not be necessary at all.

The technology of electromagnetic acceleration of metallic plates has been developed in the field of electromagnetic metal forming, sometimes call "magneforming". In magneforming, the metallic plate is hurled against a die at high enough velocity that the plate deforms to fit the contours of the die. The kinetic energy and the momentum of the plate are the most significant measures of performance of the airbag inflation system. These parameters depend on the inductance, L, of a pancake coil with N turns of conductor, on capacitance, C, of the capacitor bank, and on the applied voltage, V. The impulse that results in the plate's momentum is proportional to these parameters according to the following equation, for thick plates:

$$\text{Impulse} = KN^2V^2C^{1.5}L^{-0.5}. \tag{1}$$

Constant K depends on the properties of the metallic plate material, primarily its electrical conductivity. In addition, experiments with thin plates indicate that the exponents in Equation 1, which apply to thick plates, cannot be applied accurately to predict the performance of thin plates. For this reason it has been necessary to conduct experiments with many metals and many plate thicknesses. Aluminum and copper plates have been found to be practical for airbag inflation applications.

As indicated by Equation 1, impulse delivered to the plate depends on the coil parameters N and L, as well as capacitance C and voltage V. There exists, therefore, a great flexibility in designing electromagnetic systems, depending on the application for which the system is intended. At the present time, great strides are being made in developing low volume, high capacity capacitors, which will make electromagnetic devices more practical than they can be at present.

A substantial volume of air must be compressed by the driver subsystem in order to fill the airbag. If the air compression thermodynamics were identical with the thermodynamics of the flow process between the driver and the airbag, the driver volume would be equal to the airbag volume. In fact, the driver volume is somewhat smaller than airbag volume, since the thermodynamic processes are different. Air is compressed isentropically by the driver subsystem, but it expands into the airbag in a throttling process, at constant temperature, after the release valve functions. The following table is an illustration based on delivering one cubic foot (1,728 cu. in.) of 10 psi air to an airbag, requiring approximately 12 kilojoules of electrical energy to operate the drive subsystem.

TABLE 1

| DRIVER SUBSYSTEM PARAMETERS FOR 1 CU. FT., 10 PSI BAG | | | | |
|---|---|---|---|---|
| Volume of Compressed Air, in³ | 1 | 3 | 10 | 30 |
| Peak Pressure, psi | 42,700 | 14,200 | 4,270 | 1,420 |
| Total Driver Volume, in³ | 298 | 409 | 584 | 814 |
| ½" Thick Al Piston Vol., ft/sec | 487 | 438 | 390 | 349 |

An alternate embodiment of the invention is shown in FIG. 3, wherein the driver subsystem 140 provides repulsive forces against a folded airbag 150, causing the bag to inflate and thereby draw air into the bag through flapper or slider valve 160. The material of the airbag consists of a metal foil layer 170 inside a flexible, impermeable outer layer 180 which is strong enough to withstand the inflation forces and to withstand the air pressure developed inside the airbag when the bag performs as a cushion and the air becomes compressed. When the inflated bag performs as a cushion, flapper valve 160 prevents the air from escaping from the bag.

In FIG. 3, the driver subsystem is shown outside the bag; alternatively, the driver subsystem may be inside the bag. Also in FIG. 3, the bag is shown built-in to a supporting structure; however, the bag may be clamped during inflation and made removable from the inflating system. Only one fold is shown in FIG. 3, but many folds may be used, depending on how large an inflated bag is desired.

Figures 4A, 4B:
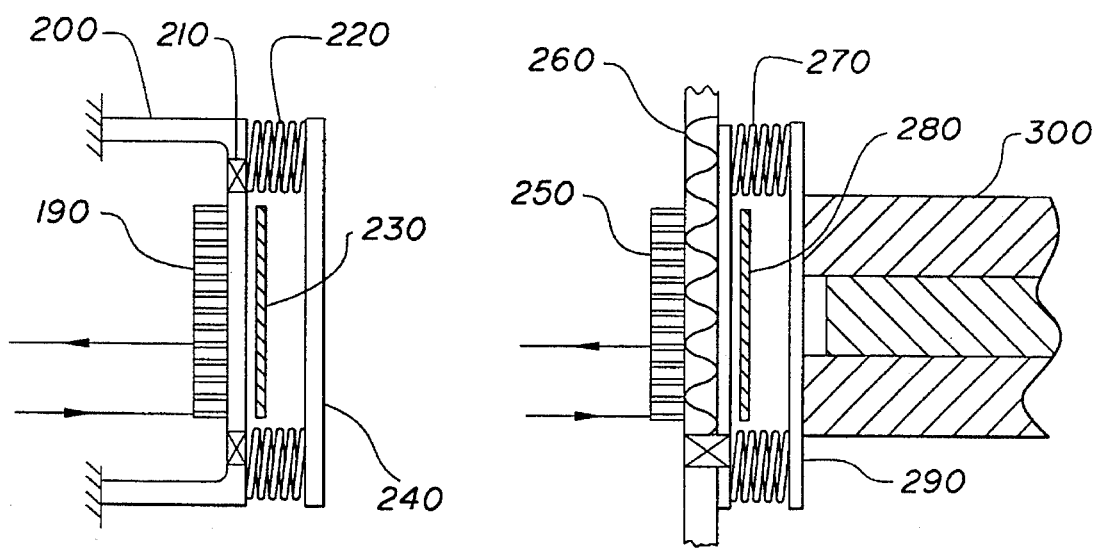
FIGS. 4A and 4B are schematic representations of driver subsystems which utilize electromagnetic energy to inflate airbags.

FIG. 4A shows an alternative configuration of the elements of FIG. 3. The airbag consists of rear panel 200 containing one or more valves 210, bellows 220, and front panel 240 made of a soft compliant material. Electromagnetic coil 190 repels metallic plate 230, which is thin enough to be very flexible, to impact on front panel 240 in order to inflate the bag.

FIG. 4B shows how the electromagnetic inflation system may be applied for efficiently loading boxes with merchandise that must be cushioned from mechanical shock during shipping. The purpose of this application is to eliminate the storage volume and manual labor requirements of packing with plastic "popcorn", and to eliminate the labor of attaching compressed air hoses to the packing box if compressed airbags are employed. In FIG. 4B the bag's rear panel may be made integral with the side 260 of the corrugated box, and the corrugated boxes may be stored and delivered with airbags in their collapsed and flat configuration, attached to each side panel and top and bottom panels. FIG. 4B shows a side panel of a shipping box, with several boxes 300 of merchandise loaded inside the box, some of them bearing directly against the bag's inner panel 290. Electromagnetic coil 250 is located outside the shipping box, and it can repel flexible metallic plate 280 without requiring any connection to the box. When metallic plate 280 strikes the bag's inner panel 290, the airbag expands and the flexible panel 290 conforms to the shapes of merchandise boxes 300. If all sides of the shipping box contain airbags and they are inflated by electromagnetic pulses simultaneously, the merchandise boxes will be cushioned on all sides.

It is preferred to use electromechanical deployment mechanisms, rather than the potentially hazardous and polluting propellants commonly used to inflate automobile airbags or to provide explosive actuation of dynamic devices, for reasons of safety and environmental responsibility. More preferably, rather than considering solenoids which are relatively slow-acting, electromagnetic coils can function rapidly enough to provide protection in the dynamic crash environment. FIGS. 5A and 5B illustrate the kinds of electromagnetic coils that may be employed as motors to drive cushion deployment mechanisms and airbags in accordance with the present invention.

FIG. 5A depicts flat spiral coil 310, commonly called a "pancake coil," mounted on support structure 320, and supplied with electrical energy from battery or capacitor 330 when switch 340 closes in response to a signal from a crash sensor located on board the vehicle. When current flows from the power supply 330 into coil 310, an intense electromagnetic field is generated, and this field induces eddy currents in metallic plate 350 which is located initially adjacent to the surface of pancake coil 310. The currents in plate 350 interact with the currents in coil 310, forcing plate 350 violently away from coil 310. Flying plate 350 has momentum and kinetic energy which may be employed to drive a variety of cushion deployment or airbag inflation mechanisms.

FIG. 5B depicts an alternate kind of electromagnetic coil, consisting of helical coil 360 and slider plate 370 inserted within the coil. In this case, the coil's currents interact with the induced currents in the plate to accelerate the plate edgewise away from the coil. This slider plate system may also be employed to drive a variety of cushion deployment mechanisms.

Power supply 330 may consist of a capacitor, which stores electrical energy at relatively high voltages, or a battery that stores electrical energy at lower voltages. In either case, the energy is delivered to the electromagnetic coil in a relatively short time, on the order of 1 millisecond or less. The power supply could even be an inductive coil which stores energy. Flying plate velocities may be from zero to more than 500 meters per second, depending on the application of its motor function.

In automotive applications, pre-formed cushions are often applied more easily for side impact crash protection, since side visibility is not imperative for the driver who is attempting to control the vehicle during the crash event. For frontal impact protection, however, it would be important to remove the cushions that could interfere with the driver's vision, and that could prove difficult after passengers have impacted against the cushions. For this reason, practical embodiments of the invention are cited herein which illustrate protection against injury caused by side impacts, even though applications for frontal protection are possible, particularly for rear seat passengers.

FIG. 6 shows passenger 410 seated beside a door and window protected by foam pad 380 for head protection, foam pad 390 for thoracic protection, and foam pad 400 for protection of the lower extremities. Note the differences in thickness of the foam pads, designed to prevent large relative deflections between body segments. The neck and spinal vertebrae are particularly vulnerable to bending of the head relative to the torso, and pad 380 is therefore made especially thicker than pad 390. Pads 380, 390, and 400 are preferably stowed under the car roof as shown in dashed outline, prior to deployment.

Upon receiving the proper signal for side impact the pads deploy along tracks installed under the car's roof to their proper positions along the side of the car, in the manner of a roll-top desk. Each pad may be segmented to permit easy motion around the curve from the roof top to the side of the car. Also, the pads in their stowed location under the car's roof provide protection against head impact caused by vertical bouncing or by car rollover.

In FIG. 7, the protective pads 430 and 440 are stowed inside door 450, where pad 430 is shown in dashed outline inside the door and pad 440 is shown in its initial and final position. Upon receiving the signal for side panel deployment, pad 430 is pulled upward by an electromagnetic motor in order to provide side impact protection for passenger 420.

FIG. 8 shows one possibility of pad stowage in car seat 460, where pad 470 is rotated downward to provide thoracic protection. Alternately, for head protection pad 470 may be rotated upward. In either case, the electromagnetic driver system may be located within car seat 460. Pads 380, 390, 400, 430, 440, and 470 may all be deployed with electromagnetic driver subsystems as substantially described above, even if air is not needed to inflate the cushions. In this fashion, the electromagnetic energy is employed to simply move the cushion.

Although pre-formed cushions may be applied for side impact crash protection, as shown in FIGS. 6–8, these protective functions may also be accomplished with inflatable airbags. The main advantage of inflatables over pre-formed cushions is that they are deflated rapidly after the crash, thereby removing any possible impediment to passenger egress from a damaged vehicle that might be in danger of fire.

When ambient air is drawn into a rapidly expanding airbag through an orifice, there is a pressure drop across the orifice, leading to a momentary below-ambient pressure inside the airbag. Since the flexible airbag fabric cannot sustain any appreciable pressure difference, there is a tendency for the fabric of the sides of the driver plate to crumple inward. It is desired to create a frontal bag area as large as possible however to cope with oblique collisions and to accommodate passengers who may not be located opposite the airbag's central axis. Therefore, means must be provided to shape the airbag with a large frontal area, despite the tendency for inward crumpling caused by negative air pressure. Several methods may be employed to either force the airbag's fabric out laterally, or to increase the airbag's internal pressure, or both.

Methods of increasing internal airbag pressure above ambient pressure include the use of stored gas, such as nitrogen or carbon dioxide, and the use of gas generated by small gas generators. Although it must be noted that addition of pressurized gas to the airbags will produce some overpressure in the passenger compartment, the amount of overpressure can be made much smaller than if all the airbag inflation had been accomplished with propellants. Another method of producing a small positive pressure inside the airbag is shown in FIG. 9.

Figure 9:
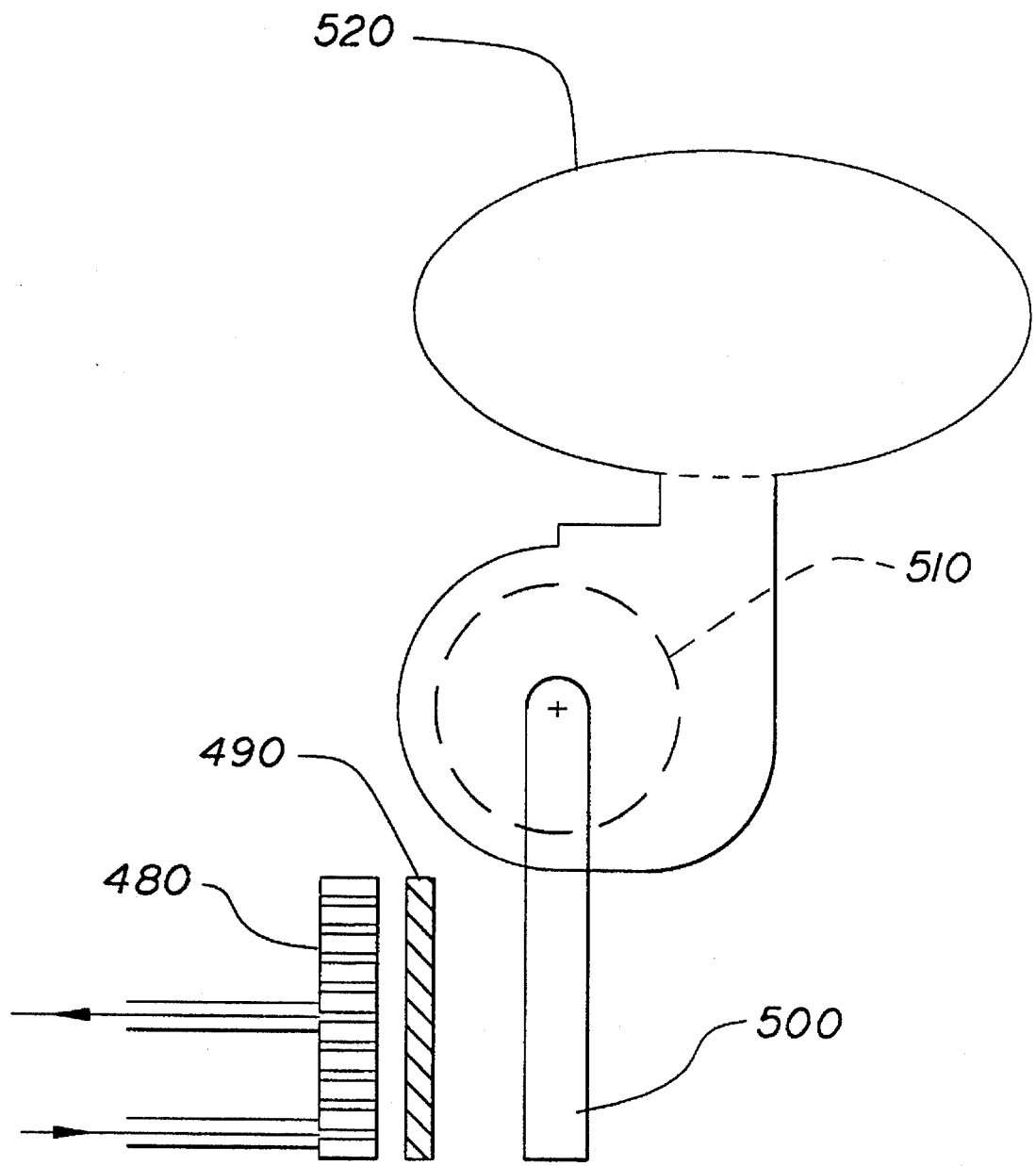
FIG. 9 is a schematic representation of a driver subsystem which uses a rotary blower to inflate an airbag.

In FIG. 9, the driver subsystem 480 which preferably is a coil propels plate 490 against accelerator rod 500, which is attached rigidly to a shaft that drives rotary blower 510. When plate 490 impacts on rod 500, its linear momentum is transferred as angular momentum of the rod and the blower wheel, and the blower wheel is accelerated very rapidly to a high enough speed to inflate airbag 520. Although coil 480 may be employed to drive accelerator rod 500 directly, the extremely short loading duration may result in structural damage to rod 500 and wheel 510. One purpose of employing plate 490 is therefore to increase the loading duration on rod 500 by virtue of the plate's flexibility, thereby reducing the forces applied to rod 500.

In some embodiments of the invention such as is shown in FIG. 3 the frontal area of the airbag 550, shown in FIGS. 10A–10C, will be approximately equal to the area of electromagnetic coil 540, because the air that has been drawn into the bag through a valve such as that shown at 160 in FIG. 3 will be slightly below the ambient pressure existing inside the car's passenger compartment and, therefore, there will not be any tendency for the bag's internal pressure to force the sides of the bag to bulge out laterally. Increasing the airbag's frontal area may be advantageous in providing protection in oblique automobile collisions.

Referring again to FIGS. 10A–10C, an embodiment of the invention is shown where an airbag's frontal area is increased so as to protect out of position passengers or for protection in oblique automobile collisions. In a preferred embodiment, a thin aluminum plate 530 is located against the face of an electromagnetic coil 540. The airbag 550 is folded with its front face in contact with plate 530. An orifice 560 is open to the ambient atmosphere in the passenger compartment and is adapted to transfer air to the airbag from the passenger compartment as the plate 530 opens the air bag 550. The entire apparatus is mounted on a mounting surface 570 which is conventionally a steering wheel in an automobile that houses the airbag.

When energy is dumped into coil 540 through terminals 580 from a battery or capacitor, the electromagnetic field induced in coil 540 repels plate 530 at high velocity into the airbag 550, thereby pulling airbag 550 open. The action of plate 530 as it moves through airbag 550 causes air to be pulled through orifice 560 so as to inflate the airbag. As the airbag is opened, the bag is stretched forward and elastic tethers 590 which are interfaced to the mounting surface 570 and to a multiplicity of points inside the airbag are extended. Referring specifically to FIG. 10B, as elastic tethers 590 are stretched within the airbag, airbag 550 inflates to atmospheric pressure through orifice 560. When the airbag is fully inflated, an orifice valve (not shown) is closed before tethers 590 begin pulling the airbag back, thereby preventing air from leaving airbag 550.

Figure 10C:
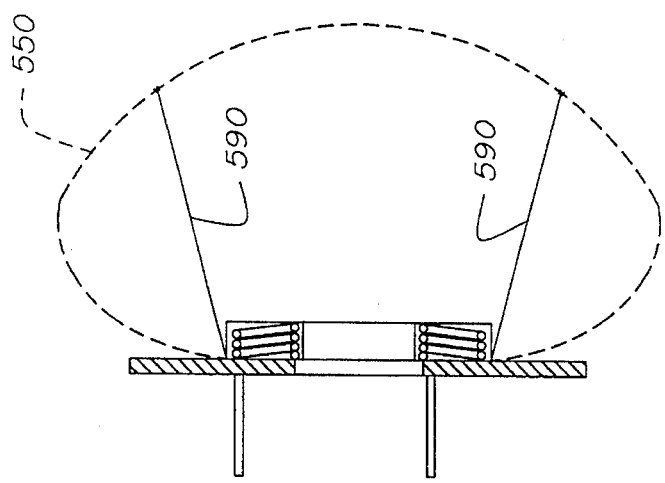
FIGS. 10A–10C are a schematic representation of unfolding an airbag and shaping an airbag to obtain maximum frontal area.
Figure 10B:
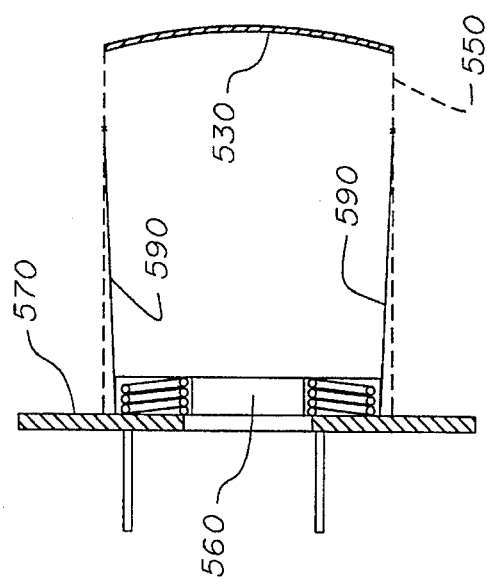
Figure 10A:
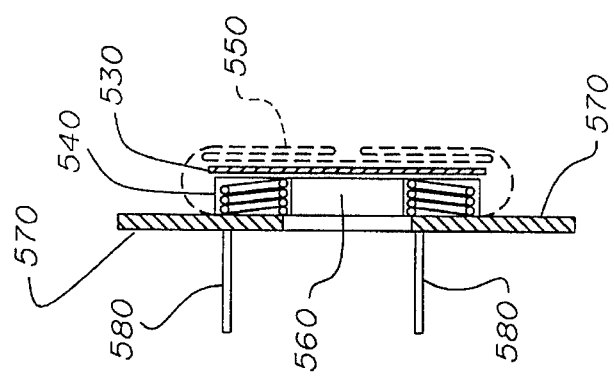

In FIG. 10C, it can be seen that the airbag 550 now has a larger frontal area. In addition, the volume encompassed by the flattened shape in FIG. 10C is smaller than the volume in FIG. 10B, thereby compressing the air in the bag. While the air pressure in the airbag may be slightly above atmospheric pressure, no overpressure exists in the passenger compartment since all the air inside the airbag 550 comes from the passenger compartment. Thus the embodiments of FIGS. 10A through 10C provide for increased frontal area to protect passengers other than those directly in front of the airbag during oblique automobile collisions.

Figure 11A:
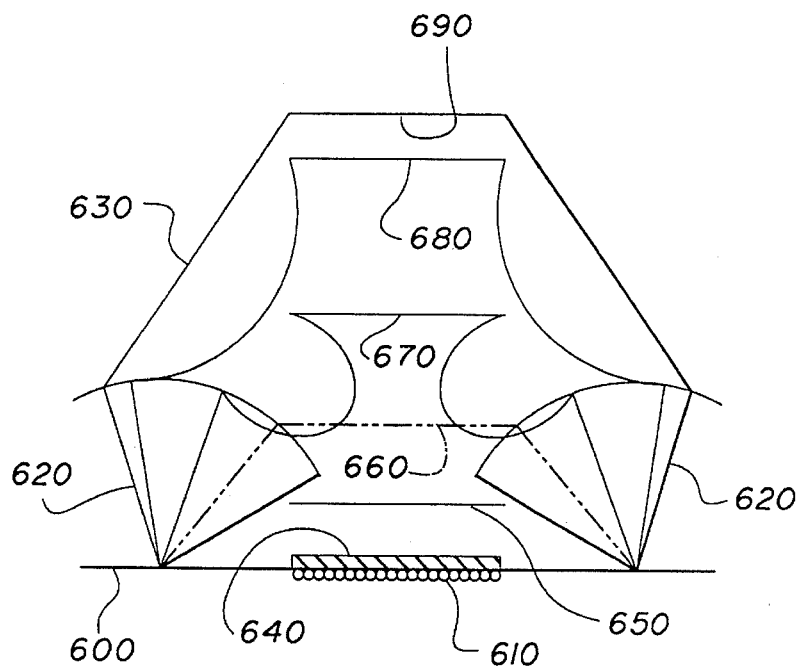
FIGS. 11A and 11B illustrate the sequence of airbags being opened and which are shaped by the inertia of ribs.
Figure 11B:
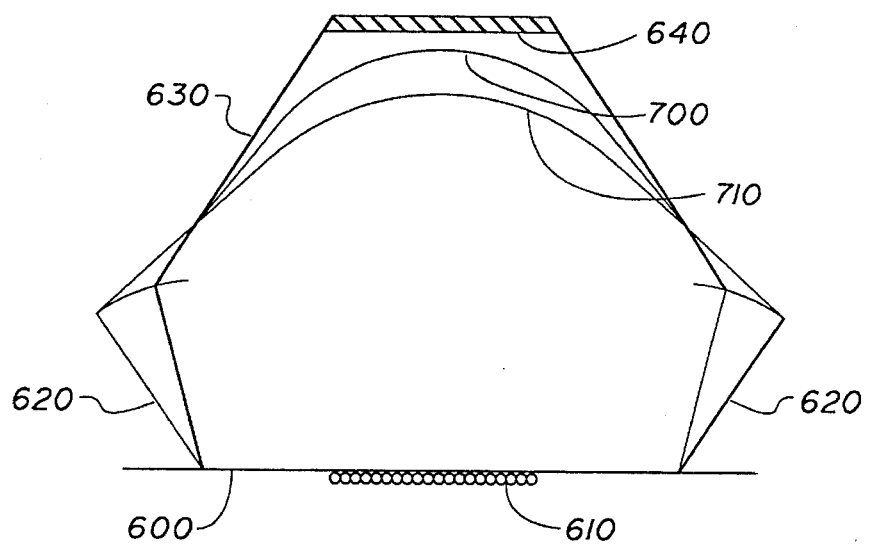

FIGS. 11A and 11B illustrate the inflation sequence of a typical driver's airbag, which consists of two circular panels of fabric sewed together at their outer diameters. The rear panel 600 has a central hole with a diameter larger than coil 610, through which air is drawn into the airbag during inflation. The outer diameter of the central hole in the rear panel is affixed to the airbag's supporting structure by means of a heavy ring, to which are hinged a multiplicity of ribs 620. The ribs are spaced evenly around the periphery of the ring, and each rib is attached to the fabric 630 of the rear panel of the airbag.

The function of the ribs 620 is to transfer inertial momentum to the airbag for two purposes; to impart lateral spreading motion to the airbag, and also to pull the front of the airbag backward after plate 640 has pulled the airbag out to its maximum stroke, thereby increasing the air pressure inside the bag above the ambient pressure inside the car's passenger compartment. In the initial position shown at 650 of FIG. 11A, the airbag containing ribs 620 is folded flat against plate 640, which is adjacent to coil 610. When plate 640 is accelerated away from coil 610, it imparts rotational velocity to ribs 620 at the same time as it imparts linear velocity to the front panel of airbag 630. As the plate 640 is still pushing the ribs rotationally and the airbag axially during opening at 660, until the plate flies clear of the ribs. Finally, at 670 and 680, the plate's momentum is pulling the front of the bag axially and the ribs' momentum is pulling the airbag laterally. In the open position at 690, the airbag fabric has been pulled taut. At this time it is intended that the ribs contain more momentum than the plate, in order to stop the axial motion of the plate and also to pull the front of the airbag back.

In FIG. 11*b* at position 700, the airbag has been squeezed by the outside air pressure to a shape consistent with equalized pressure inside and outside. In position 710, all the momentum of the ribs has been expended, and the pressure inside the airbag is above the ambient pressure outside the airbag. Detents may be required to hold the ribs back in this position, if it is desired to maintain more than ambient pressure within the airbag.

Airbag inflation systems provided in accordance with the present invention solve a unique need in the art for methods and apparatus to inflate airbags without the need for external potentially combustible gases. Furthermore, these systems remove the dangers associated with inflating airbags that currently exist, since methods and apparatus provided in accordance with the present invention utilize ambient air in a passenger compartment to inflate an airbag, thereby removing overpressure problems. Such results have not heretofore been achieved in the art.

There have thus been described certain preferred embodiments of airbag inflation devices and methods provided in accordance with the present invention. While preferred embodiments have been described and disclosed, it will be recognized by those with skill in the art that modifications are within the true spirit and scope of the invention. The appended claims are intended to cover all such modifications.

What is claimed is:

1. A system for inflating an airbag in a vehicle comprising:

energy storage means for storing electrical energy;

switching means interfaced with the energy storage means for switching the electrical energy so that the electrical energy can actuate inflation of the airbag; and energy conversion means interfaced with the switching means for receiving the electrical energy used to inflate the airbag.

2. The system recited in claim 1 wherein the energy storage means is a battery.

3. The system recited in claim 1 wherein the energy storage means is a capacitor.

4. The system recited in claim 2 or claim 3 wherein the switching means is a silicon controlled rectifier.

5. The system recited in claim 4 wherein the energy conversion means is a coil.

6. The system recited in claim 5 further comprising an airbag.

7. The system recited in claim 6 wherein said energy conversion means further comprises inflation means interfaced with the coil and the airbag for converting the electrical energy to mechanical energy to open the airbag.

8. The system recited in claim 7 wherein the inflation means is a plate.

9. The system recited in claim 8 further comprising means interfaced with the airbag for causing air in the vehicle to inflate the airbag as the plate opens the airbag.

10. The system recited in claim 9 wherein the means for causing air in the vehicle to inflate the airbag is an orifice.

11. The system recited in claim 9 wherein the airbag is inflated above ambient pressure in the vehicle.

12. The system recited in claim 11 further comprising means for shaping the airbag after it has been inflated.

13. The system recited in claim 12 further comprising sensor means interfaced to the silicon controlled rectifier for sensing a collision and sending a signal to the silicon controlled rectifier to generate the coil's field.

14. An automobile airbag inflation system which causes an airbag included therein to inflate when the automobile experiences an impact comprising:

energy storing means for storing electromagnetic energy which will cause the airbag to inflate when the automobile experiences an impact;

sensor means interfaced to the energy storing means for sensing when the automobile experiences an impact;

switch means interfaced to the sensor means for switching the electromagnetic energy to inflate the airbag upon receiving a signal from the sensor means that the automobile has experienced an impact;

energy conversion means interfaced to the energy storing means for converting the electromagnetic energy from the energy storing means after switching; and inflation means interfaced to the energy conversion means for inflating the airbag.

15. The system recited in claim 14 wherein the energy storing means is a capacitor.

16. The system recited in claim 15 further comprising means for charging the capacitor.

17. The system recited in claim 14 wherein the energy storing means is a battery.

18. The system recited in claim 15 or claim 17 wherein the energy conversion means is a coil.

19. The system recited in claim 18 wherein the inflation means comprises:

opening means for opening said airbag responsive to said energy conversion means; and means interfaced with the airbag for inflating the airbag with ambient air from the automobile's passenger compartment.

20. The system recited in claim 19 wherein the opening means is a plate.

21. The system recited in claim 19 wherein the opening means is a piston.

22. A method of inflating an airbag which protects passengers in an automobile passenger compartment during a collision comprising the steps of:

sensing the collision;

switching electromagnetic energy to a coil after the collision is sensed;

converting the electromagnetic energy to mechanical energy; and inflating the airbag using the mechanical energy.

* * * * *